(12) United States Patent
Smith

(10) Patent No.: US 9,869,360 B2
(45) Date of Patent: Jan. 16, 2018

(54) MULTI-PIECE NUT FOR USE WITH A SHOCK

(71) Applicant: Justin Smith, Wittman, AZ (US)

(72) Inventor: Justin Smith, Wittman, AZ (US)

( * ) Notice: Subject to any disclaimer, the term of this patent is extended or adjusted under 35 U.S.C. 154(b) by 130 days.

(21) Appl. No.: 14/681,769

(22) Filed: Apr. 8, 2015

(65) Prior Publication Data

US 2015/0308536 A1 Oct. 29, 2015

Related U.S. Application Data

(60) Provisional application No. 61/983,375, filed on Apr. 23, 2014, provisional application No. 62/007,236, filed on Jun. 3, 2014.

(51) Int. Cl.
*F16B 37/08* (2006.01)
*F16F 1/12* (2006.01)
*F16F 9/56* (2006.01)

(52) U.S. Cl.
CPC .......... *F16F 1/121* (2013.01); *F16B 37/0864* (2013.01); *F16B 37/0892* (2013.01); *F16F 9/56* (2013.01); *F16F 2226/04* (2013.01); *F16F 2230/0005* (2013.01); *F16F 2230/46* (2013.01)

(58) Field of Classification Search
CPC ....... F16F 9/54; F16F 9/56; F16F 9/58; F16B 37/0892; F16B 37/08; F16B 37/0871; B60G 15/068
USPC ...................... 411/437, 433, 539; 267/33, 34
See application file for complete search history.

(56) References Cited

U.S. PATENT DOCUMENTS

| | | | | |
|---|---|---|---|---|
| 3,010,714 A | * | 11/1961 | Stresnak | B60G 15/063 267/221 |
| 3,043,581 A | * | 7/1962 | Schmidt | B60G 15/063 267/218 |
| 3,528,700 A | * | 9/1970 | Janu | B62J 1/02 248/410 |
| 3,559,976 A | * | 2/1971 | Jerz, Jr. | F16F 3/04 267/168 |
| 3,572,678 A | * | 3/1971 | Jerz, Jr. | F16F 3/04 267/225 |
| 3,951,391 A | * | 4/1976 | Papousek | B60G 15/063 267/218 |
| 4,410,293 A | * | 10/1983 | Elias | F16B 31/04 403/24 |
| 4,962,834 A | * | 10/1990 | Miner | B60G 11/16 188/321.11 |
| 5,263,695 A | * | 11/1993 | Bianchi | B60G 11/32 267/225 |
| 6,142,268 A | * | 11/2000 | Kuo-An | F16F 9/42 188/274 |

(Continued)

*Primary Examiner* — Flemming Saether
(74) *Attorney, Agent, or Firm* — Schmeiser, Olsen & Watts LLP

(57) ABSTRACT

A multi-piece nut for use with a shock is provided. The multi-piece nut includes a first nut member and a second nut member removably coupled to the first nut member. The first nut member and second nut member include threads on an inner surface that correspond to each other when coupled together. The multi-piece nut may also include an aperture formed when the first nut member and second nut member are coupled together. The first and second nut members are coupled around a shock absorber, and the shock absorber extends through the aperture and engages the threads. The nut can then be rotated to adjust the spring of the shock.

5 Claims, 8 Drawing Sheets

(56) References Cited

U.S. PATENT DOCUMENTS

| | | | |
|---|---|---|---|
| 7,357,382 B2 * | 4/2008 | Pare | F16F 1/126 |
| | | | 267/179 |
| 7,610,845 B2 * | 11/2009 | Weiner | F15B 15/24 |
| | | | 403/344 |
| 8,573,573 B2 * | 11/2013 | Michel | B60G 15/068 |
| | | | 267/218 |
| 9,140,325 B2 * | 9/2015 | Cox | B60G 15/063 |
| 2007/0144844 A1 * | 6/2007 | Riley | F16F 3/04 |
| | | | 188/281 |
| 2017/0016507 A1 * | 1/2017 | Funato | F16F 9/58 |

\* cited by examiner

MULTI-PIECE NUT FOR USE WITH A SHOCK

CROSS REFERENCE TO RELATED APPLICATION

This application claims priority from U.S. Patent Application No. 61,983,375, filed Apr. 23, 2014 and entitled "Two Piece Nut For Use With A Shock," and U.S. Patent Application No 62/007,236, filed Jun. 3, 2014 and entitled "Multi-Piece Nut For Use With A Shock," which are incorporated entirely herein by reference.

BACKGROUND OF THE INVENTION

Technical Field

This invention relates generally to a nut for use with a vehicle shock absorber and more particularly to a multi-piece nut for use with a shock.

State of the Art

The use of shocks is common place for vehicles and provides significant advantages. These advantages include reducing the road impact transmitted from the wheels to the chassis and, therefore, to the occupants of the vehicle when it travels over bumps. Further, depending on the size of the bump, without suspension the tires could lose contact with the road therefore losing traction, which, it would also be uncomfortable. Additionally, the chassis would be subjected to damaging shock loads, and directional/steering control could be lost.

A common type of shock absorber currently in use is a coil spring over shock, typically referred to, a "coilover," as shown in FIG. 1. A coilover 10 consists of a shock absorber 12 with a coil first spring 14 encircling it. Some coilovers 10 allow adjustment of first spring 14 response rates by use of a nut 16. Stiffness can be changed by switching first spring 14 for one with a different response rate. However, switching first spring 14 or repairing a damaged coilover 10 requires considerable labor to disassemble shock 10 from the vehicle to make such changes. The main reason is that to remove first spring 14, spring nut 16 must be removed by unthreading it from shock absorber 12.

Accordingly, there is a need in the field of coil spring over shocks for an improved spring nut.

SUMMARY OF EMBODIMENTS

The present invention relates to a multi-piece nut for use with a shock, wherein the multi-piece nut generally comprises a first nut member and a second nut member removably coupled together. The first and second nut members coupled together form a spring nut having an aperture of a size and shape to engage a shock absorber of a coil spring over shock.

Embodiments include a multi-piece nut for use with a shock. The multi-piece nut comprises a first nut member and a second nut member, wherein the second nut member is removably coupled to the first nut member. The multi-piece nut may also include an aperture formed when the first nut member and second nut member are coupled together, wherein the first and second nut members are coupled to a shock absorber, and the shock absorber extends through the aperture and engages threads of the multi-piece nut.

Embodiments include a multi-piece nut for use with a shock comprising a first nut member comprising a first inner thread; a second nut member comprising a second inner thread, wherein the second nut member is removably coupled to the first nut member such that the first inner thread corresponds to the second inner thread when the first nut member and the second nut member are coupled together; and an aperture formed when the first nut member and second nut member are coupled together, wherein the first and second nut members are coupled around a shock, wherein the shock extends through the aperture and engages the first and second threads.

In some embodiments, the multi-piece nut further comprises a connector wherein the connector removably couples the first nut member to the second nut member. In some embodiments, the multi-piece nut further comprises a shock; and a shock spring. In some embodiments, the multi-piece nut further comprises a dampening device coupled to the shock and interposed between the shock and the shock spring. In some embodiments, the multi-piece nut further comprises a first nut member with a first outer thread and a second nut member with a second outer thread, wherein the second nut member is removably coupled to the first nut member such that the first outer thread corresponds to the second outer thread when the first nut member and the second nut member are coupled together; a third nut member comprising a third inner thread, wherein the third nut member is removably coupled to the coupled first and second nut members by engagement of the first and second outer threads of the coupled first and second nut members with the third inner thread of the third nut member; and an aperture formed when the first nut member and second nut member are coupled together, wherein the first and second nut members are coupled to a shock, wherein the shock extends through the aperture and engages the first and second inner threads of the coupled first and second nut members.

Another embodiment includes a multi-piece nut for use with a shock comprising a first nut member comprising a first inner thread; a plurality of second nut members comprising a second inner thread, wherein the second nut members are removably coupled to the first nut members such that the first inner thread corresponds to the second inner threads when the first nut member and the second nut members are coupled together; and an aperture formed when the first nut member and second nut members are coupled together, wherein the first and second nut members are coupled around a shock, wherein the shock extends through the aperture and engages the first and second threads.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

Figure 1:
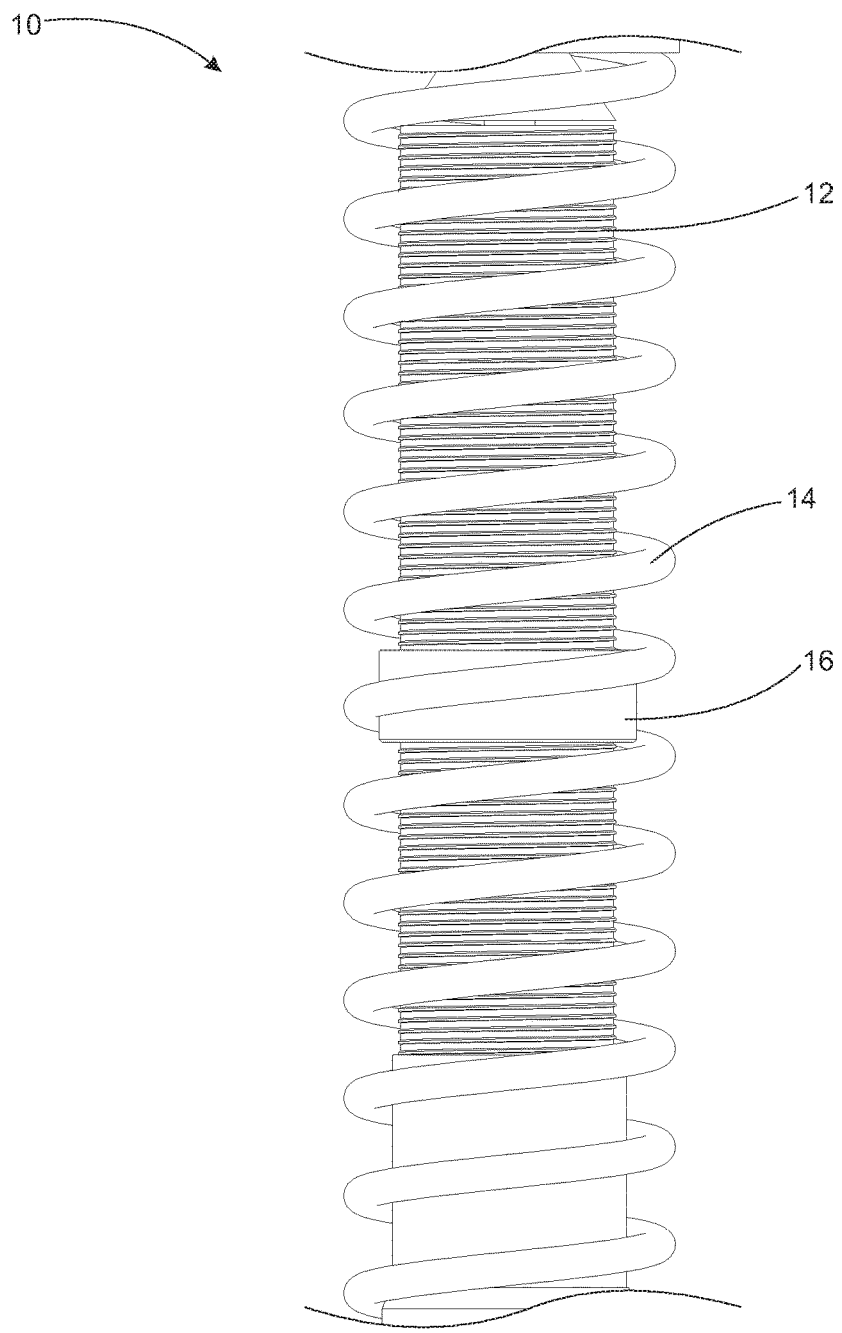
FIG. 1 is a perspective view of a prior art coil spring over shock.
Figure 2:
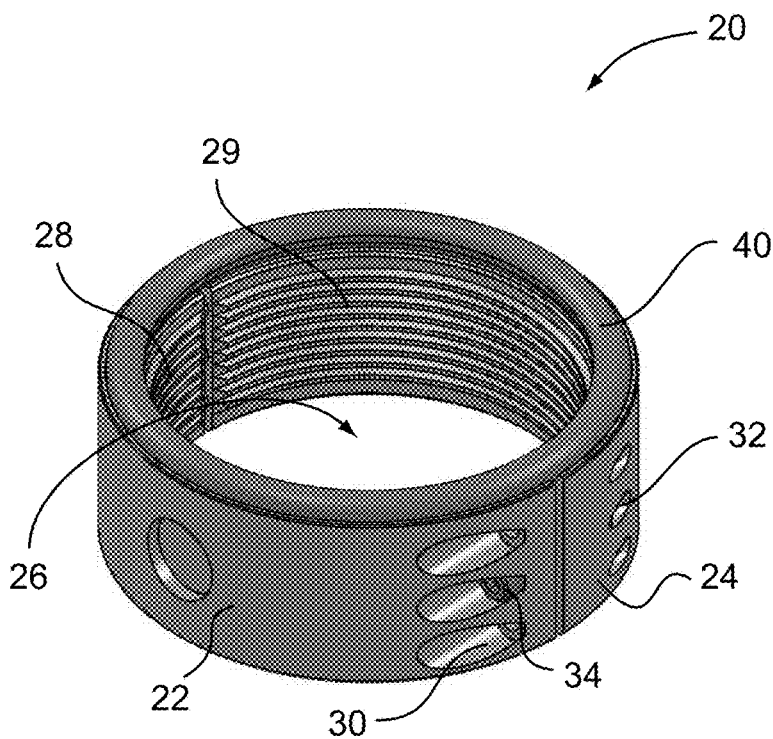
FIG. 2 is a perspective view of a multi-piece nut for use with a coil spring over shock.
Figure 3:
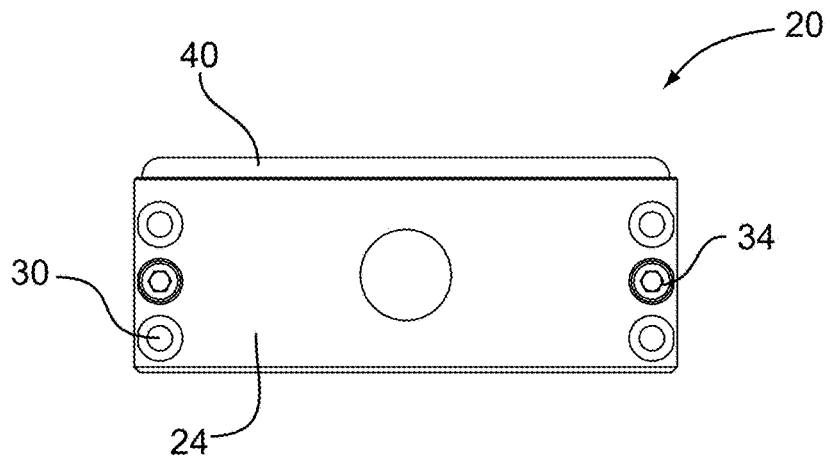
FIG. 3 is a front view of a multi-piece nut for use with a coil spring over shock.
Figure 4:
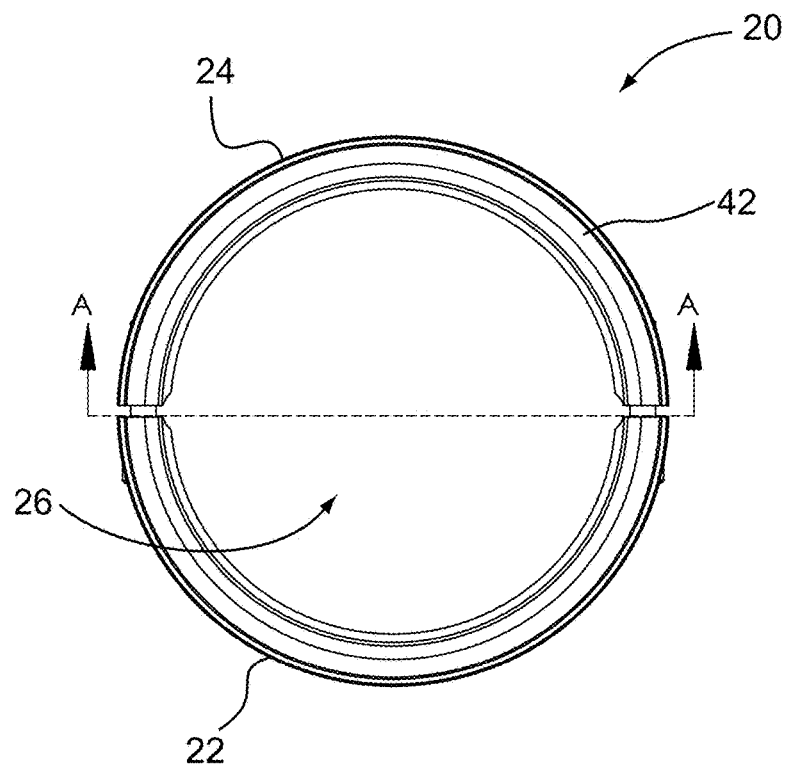
FIG. 4 is a first top view of a multi-piece nut for use with a coil spring over shock.
Figure 5:
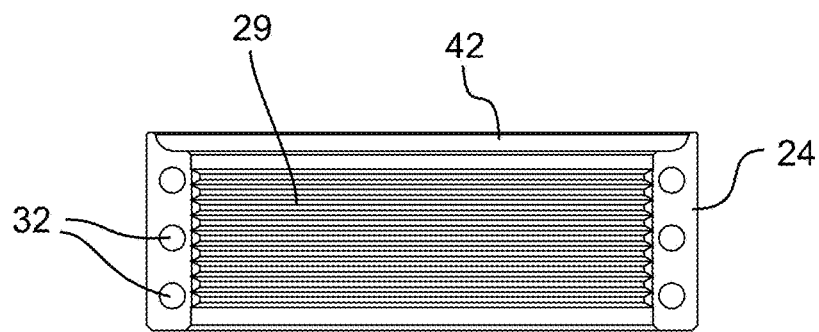
FIG. 5 is a section view of a multi-piece nut for use with a coil spring over shock taken along line A-A of FIG. 4.
Figure 6:
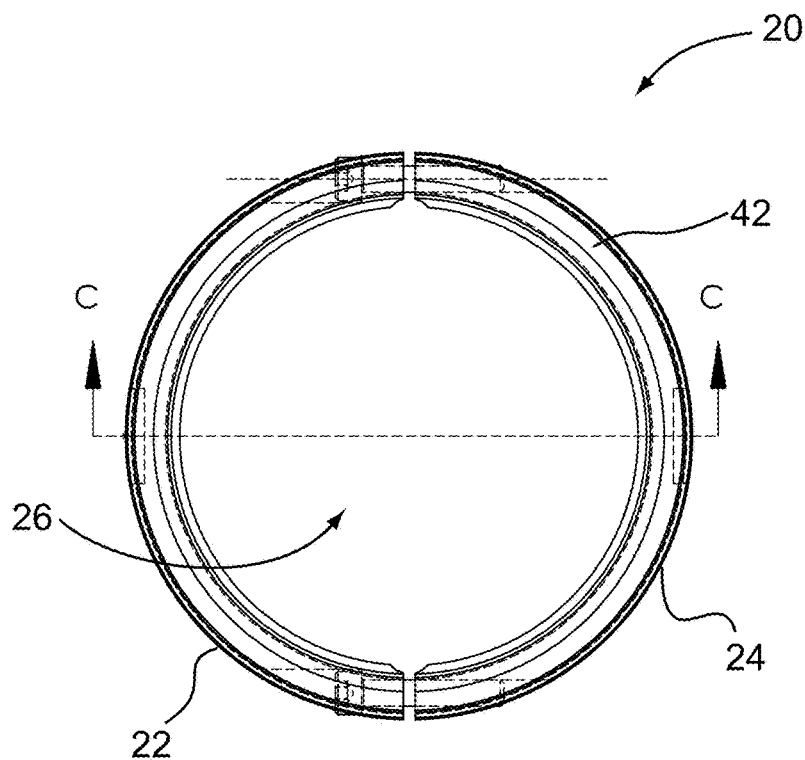
FIG. 6 is another top view of a multi-piece nut for use with a coil spring over shock.
Figure 7:
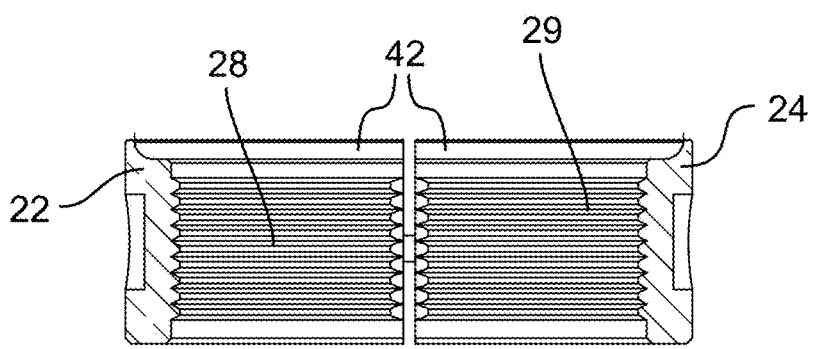
FIG. 7 is a section view of a multi-piece nut for use with a coil spring over shock taken along line C-C of FIG. 6.

As discussed above, embodiments of the present invention relate to a multi-piece nut for use with a shock, wherein the multi-piece nut generally comprises a first nut member and a second nut member removably coupled together. The first and second nut members coupled together form a spring nut having an aperture sized and shaped to engage a shock absorber of a coil spring over shock.

Referring to the drawings, FIGS. 2-7 depict a multi-piece nut 20. In some embodiments, nut 20 comprises a first nut member 22 and a second nut member 24. First nut member 22 is removably coupled to second nut member 24. When coupled together, first nut member 22 and the second nut member 24 form an aperture 26. First nut member 22 and second nut member 24 each have an inner surface that comprises a first inner thread 28 and a second inner thread 29 respectively Inner threads 28 and 29 correspond to each other such that when first nut member 22 is coupled to second nut member 24, first inner thread 28 and second inner thread 29 allow for nut 20 to thread onto a shock absorber 12.

First nut member 22 includes a first aperture 30 that corresponds to a second aperture 32 of second nut member 24. Connectors 34 engage first aperture 30 and second aperture 32 in order to removably couple first nut member 22 to second nut member 24. In some embodiments, connector(s) 34 may be a bolt.

Figure 8:
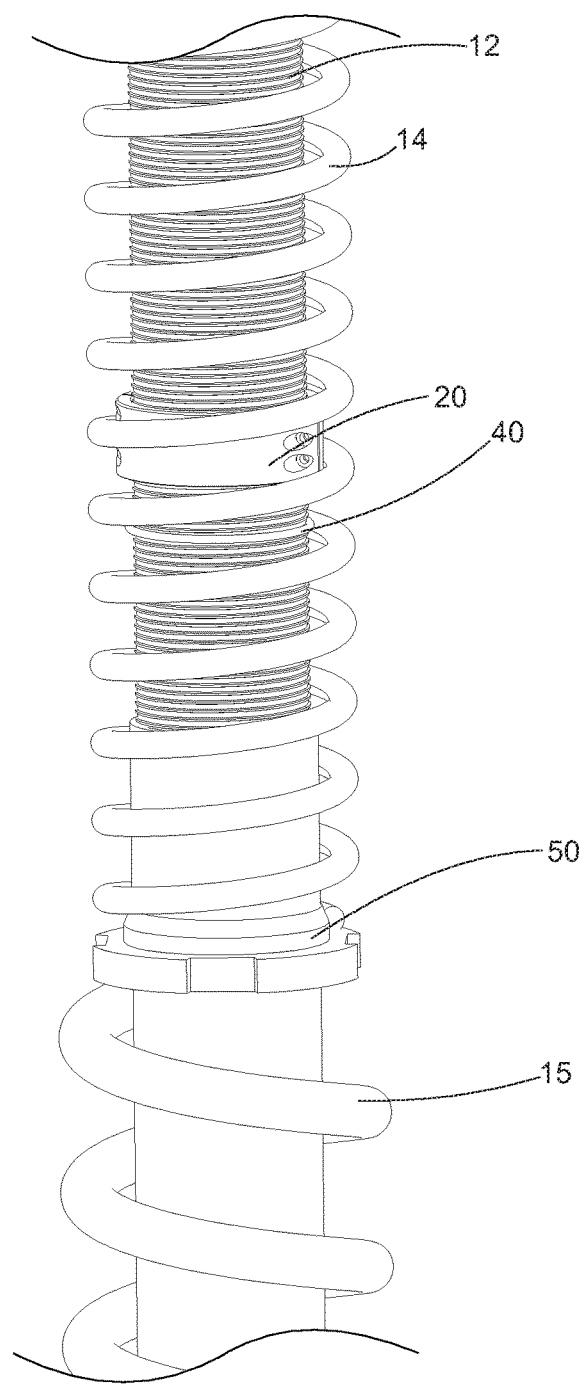
FIG. 8 is a perspective view of a multi-piece nut with a dampening device coupled to a shock.
Figure 9:
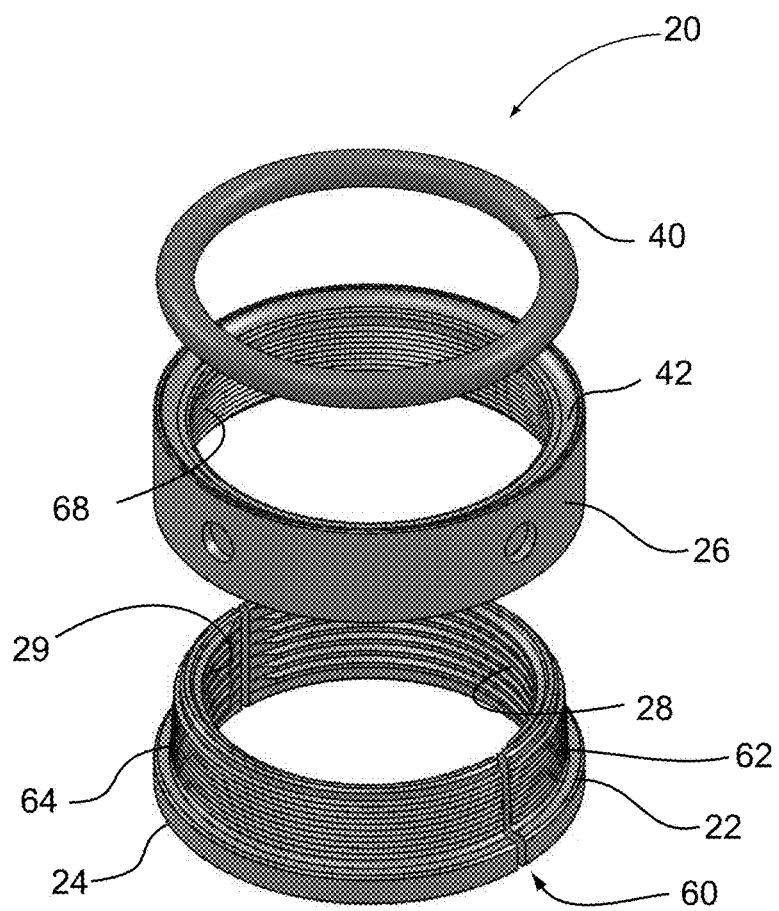
FIG. 9 is a perspective exploded view of another embodiment of a multi-piece nut with a dampening device.
Figure 10:
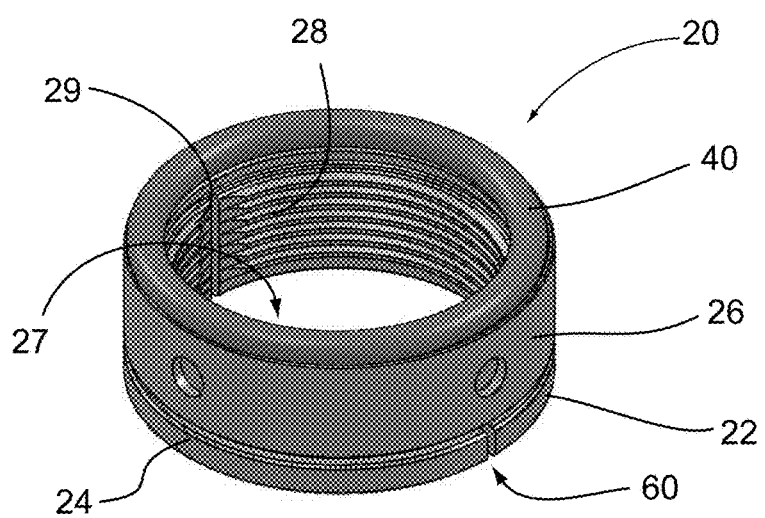
FIG. 10 is a perspective view of the multi-piece nut with dampening device of FIG. 9.
Figure 11:
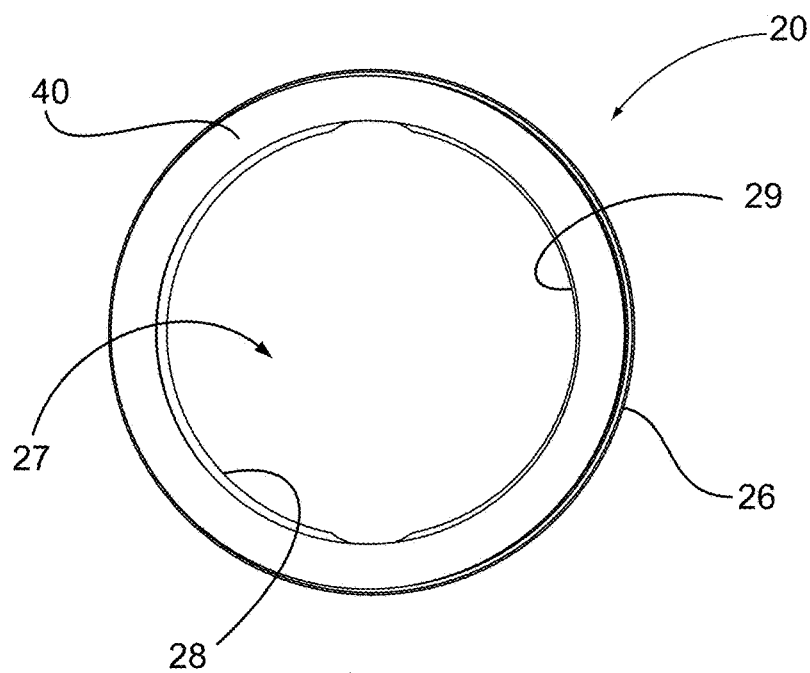
FIG. 11 is a top view of the multi-piece nut with dampening device of FIG. 9.
Figure 12:
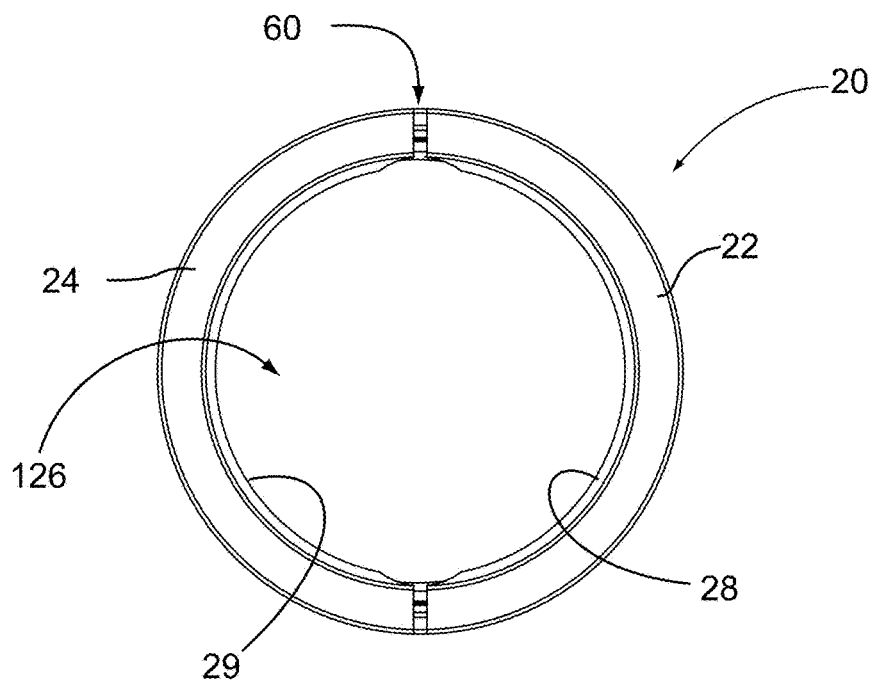
FIG. 12 is a bottom view of the multi-piece nut with dampening device of FIG. 9.
Figure 13:
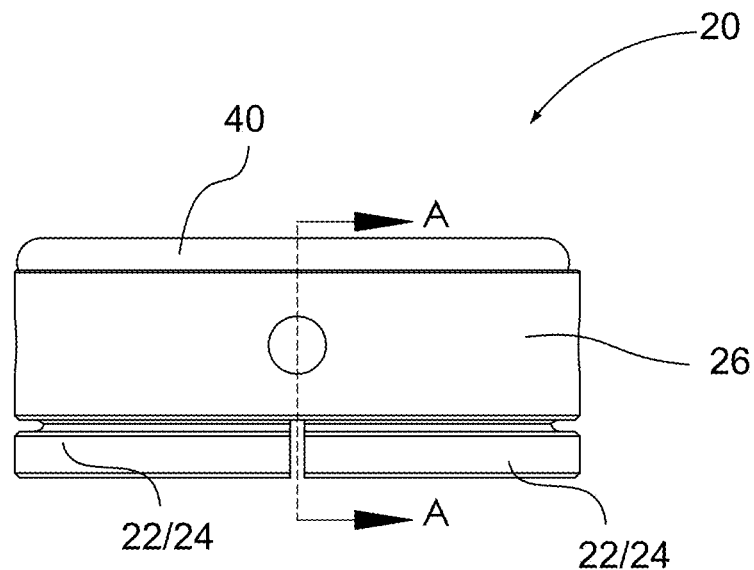
FIG. 13 is a side view of the multi-piece nut with dampening device of FIG. 9.
Figure 14:
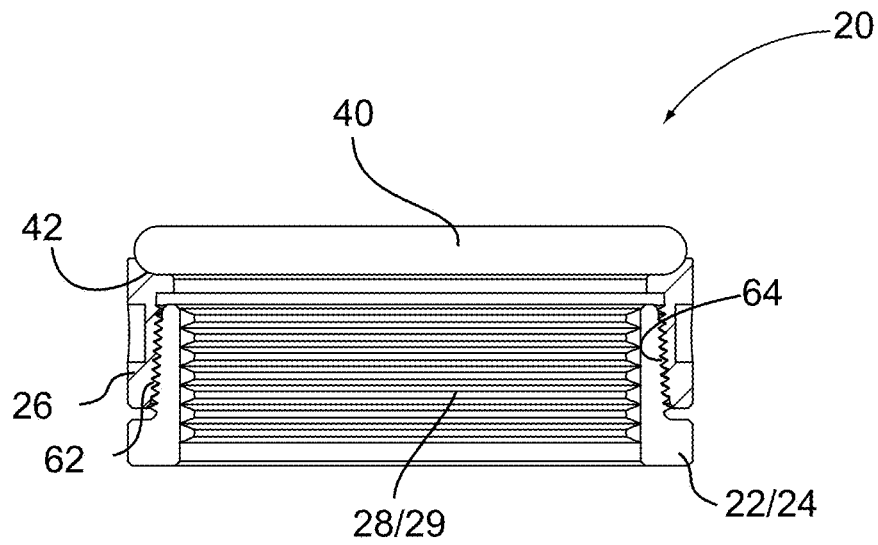
FIG. 14 is a section view of the multi-piece nut with dampening device of FIG. 13 taken along line A-A.

Nut 20 comprises a recess 42 that is formed when first nut member 22 and second nut member 24 are coupled together. Recess 42 is sized and shaped to receive a dampening device 40. Dampening device 40 engages first spring 14 when nut 20 is coupled to shock 12. In some embodiments, dampening device 40 is an elastomeric member, such as an O-ring, for example. In some embodiments, dampening device 40 is a washer. In some embodiments, dampening device 40 is some other type of dampening device. Dampening device 40 may be formed of an elastomeric material or other dampening material. Dampening device 40 operates to dampen the vibration and/or noise from a component that may contact nut 20 during operation of the shock. By way of one non-limiting example as shown in FIG. 8, a spring divider 50 may be used to separate first spring 14 from a second spring 15. As the vehicle travels over bumps, shock 12 compresses and spring divider 50 may contact dampening device 40 which engages nut 20. Dampening device 40 operates to dampen the vibration, including sound, that spring divider 50 may otherwise have caused when contacting nut 20 during operation of shock 12.

In operation, nut 20 may be separated wherein first nut member 22 and second nut members 24 are separated from each other. First nut member 22 and second nut member 24 are coupled together around a shock absorber. Connector(s) 34 operates to couple together first nut member 22 and second nut members 24. Once coupled together over shock 12, multi-piece nut 20 may be rotated to adjust the spring rate of the shock absorber.

It will be understood that although the drawings depict a multi-piece nut 20 with first nut member 22 and second nut member 24, the present invention is not limited to two pieces. For example, and without limitation, embodiments of the present invention may include three nut members, four nut members, or any number of pieces to form multi-piece nut 20.

Referring again to the drawings, FIGS. 9-14 depict another embodiment of a multi-piece nut 20. In the embodiment shown in FIGS. 9-14, and some embodiments, nut 20 comprises first nut member 22, second nut member 24, and a third nut member 26. First nut member 22 is removably coupled to second nut member 24 as described above herein, in some embodiments. In the embodiment shown, first nut member 22 further comprises a first outer thread 64 and second nut member 24 further comprises a second outer thread 66 such that first outer thread 64 corresponds to second outer thread 66 when first nut member 22 and second nut member 24 are coupled together. Third nut member 26 comprises a third inner thread 68 and a third outer thread 68. Third nut member 26 is coupled to the assembled first and second nut members 22 and 24 by engaging third inner thread 68 with first outer thread 64 of first nut member 22 and second outer thread 66 of second nut member 24. When first nut member 22 and second nut member 24 are coupled together to form multi-piece nut 20, multi-piece nut 20 comprises an aperture 27. First inner thread 28 of first nut member 22 and corresponding second inner thread 29 of second nut member 24 enable nut 20 to thread onto shock 12.

Coupled first and second nut members 22 and 24 form an inner circumference 70 and a gap 60 along the length of coupled first nut member 22 and second nut member 24. In some embodiments, as coupled first nut member 22 and second nut member 24 are coupled to third nut member 26, coupled first nut member 22 and second nut member 24 rotate to allow first outer thread 62 of first nut member 22 and second outer thread 64 of second nut member 24 to engage third inner thread 66 third nut member 26. The engagement of coupled first and second nut members 22 and 24 with third nut member 26 results in reducing inner circumference 70 of coupled first and second nut members 22 and 24. Gap 60 allows for circumference 70 of coupled first and second nut members 22 and 24 to reduce by allowing a first nut member 22 and of second nut member 24 to move toward each other. Multi-piece nut 20, in this and some other embodiments, is thus clamped onto shock 12 in response to reducing inner circumference 70 of coupled first and second nut members 22 and 24.

Multi-piece nut 20 comprises a recess 42 that is formed in first nut member 22. Recess 42 is sized and shaped to receive a dampening device 40. Dampening device 40 engages a spring when multi-piece nut 20 is coupled to shock 12. In some embodiments, dampening device 40 is an O-ring. In some embodiments, dampening device 40 is a washer or other type of dampening device. Further, dampening device 40 may be formed of an elastomeric material or other dampening material. Dampening device 40 operates to dampen vibration, including sound, of any component that contacts nut 20 during operation of shock 12. A non-limiting example in some embodiments, such as the embodiment shown in FIG. 8, a spring divider 50 may be used to separate first spring 14 from second spring 15. As the vehicle travels over bumps, shock 12 compresses and spring divider 50 may contact dampening device 40 which engages nut 20. Dampening device 40 operates to dampen the vibration and/or sound that might otherwise have been caused by spring divider 50 contacting nut 20 during operation or shock 12.

In operation, nut 20 may be separated wherein coupled first and second nut members 22 and 24 are separated from third nut member 26. Coupled first and second nut members 22 and 24 are coupled together on shock 12 with third nut member 26 by concentrically threading third nut member 26 onto coupled first and second nut members 22 and 24, thus clamping coupled first and second nut members 22 and 24 to shock 12. Once coupled to shock 12, multi-piece nut 120 may be rotated to adjust the spring rate of shock 12.

It will be understood that although the drawings depict a multi-piece nut 20 with a coupled inner first and second nut member 22 and 24 respectively, the present invention is not limited to two or three nut-member pieces comprising coupled nut members 22 and 24. For example, and without limitation, embodiments of the present invention may include three coupled inner nut members, four coupled inner nut members, or any number of coupled inner nut members, with or without third nut member 26, to form multi-piece nut 20.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A combination multi-piece nut and coil spring over shock comprising:
   a first nut member comprising a first inner thread;
   a second nut member comprising a second inner thread, wherein the second nut member is removably coupled to the first nut member such that the first inner thread corresponds to the second inner thread when the first nut member and the second nut member are coupled together;
   a shock spring having a first spring and a second spring;
   an aperture formed when the first nut member and second nut member are coupled together, wherein the first and second nut members are coupled around a shock, wherein the shock extends through the aperture and engages the first and second inner threads and the first spring and the second spring are coupled around the shock and the first spring is coupled around the first and second nut members and wherein a spring divider of the shock separates the first spring and the second spring, wherein the spring divider contacts the first and second nut members during operation; and
   a dampening device coupled to the shock within the shock spring.

2. The combination multi-piece nut and coil spring of claim 1, further comprising a connector wherein the connector removably couples the first nut member to the second nut member.

3. The combination multi-piece nut and coil spring of claim 1, wherein a spring rate of the shock is adjusted by rotating the multi-piece nut.

4. The combination multi-piece nut and coil spring of claim 1, wherein the spring divider contacts the dampening device which engages the multi-piece nut upon compression of the shock.

5. The combination multi-piece nut and coil spring of claim 1, wherein the first nut member further comprises a recess to receive the dampening device.

* * * * *